United States Patent [19]

Jackson

[11] Patent Number: 4,819,300

[45] Date of Patent: Apr. 11, 1989

[54] STRUT ASSEMBLY

[75] Inventor: Frank T. Jackson, Norco, Calif.

[73] Assignee: Hartwell Corporation, Placentia, Calif.

[21] Appl. No.: 37,333

[22] Filed: Apr. 13, 1987

[51] Int. Cl.$^4$ .................. E05D 11/10; E05C 17/32
[52] U.S. Cl. .................................. 16/327; 16/346; 292/263
[58] Field of Search ............... 16/352, 115, 326, 327, 16/346, 347, 333; 403/102, 85; 292/263

[56] References Cited

U.S. PATENT DOCUMENTS

| 1,204,329 | 11/1916 | Wilkins | 403/85 X |
| 1,557,402 | 10/1925 | Bateson | 16/346 X |
| 1,906,218 | 4/1933 | Patchell | 403/102 X |
| 2,549,573 | 4/1951 | Clark | 403/102 X |
| 4,381,559 | 3/1982 | Burton | |

FOREIGN PATENT DOCUMENTS

| 16591 | 6/1881 | Fed. Rep. of Germany | |
| 202213 | 6/1907 | Fed. Rep. of Germany | 292/263 |
| 74735 | 10/1918 | Fed. Rep. of Germany | |
| 865945 | 2/1953 | Fed. Rep. of Germany | |
| 1383123 | 11/1964 | France | 16/327 |

Primary Examiner—Nicholas P. Godici
Assistant Examiner—Carmine Cuda
Attorney, Agent, or Firm—Lyon & Lyon

[57] ABSTRACT

A strut assembly having first and second sections pivotally linked together. An overlying sleeve is extendable to lock the sections together in the extended position and retractable to allow folding of the sections relative to one another. A member is arranged at the joint between sections and biased to extend outwardly into interference with the path of extension of the sleeve. A link linking the first and second sections cooperates with the member to retract same when the strut assembly is collapsed in order that the sleeve will automatically lock the sections together when the assembly is again extended.

11 Claims, 1 Drawing Sheet

U.S. Patent
Apr. 11, 1989
4,819,300
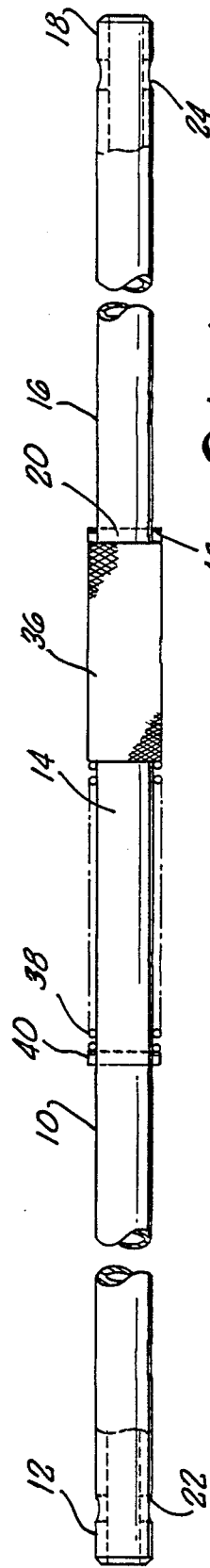
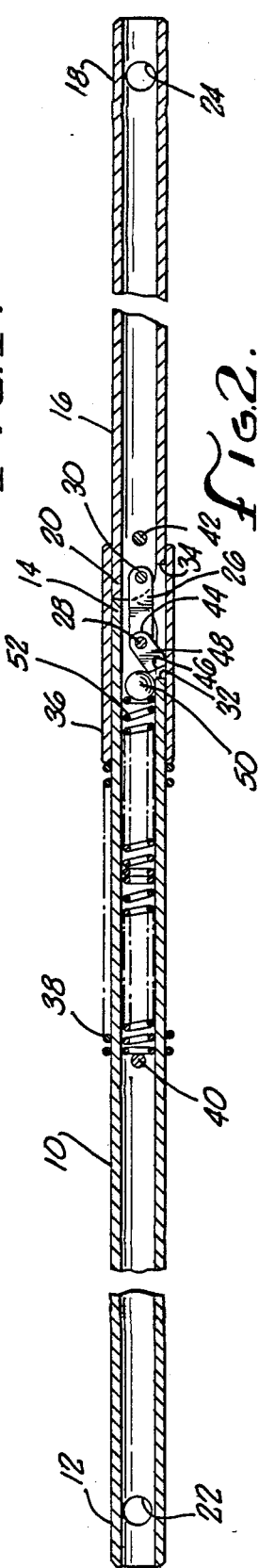
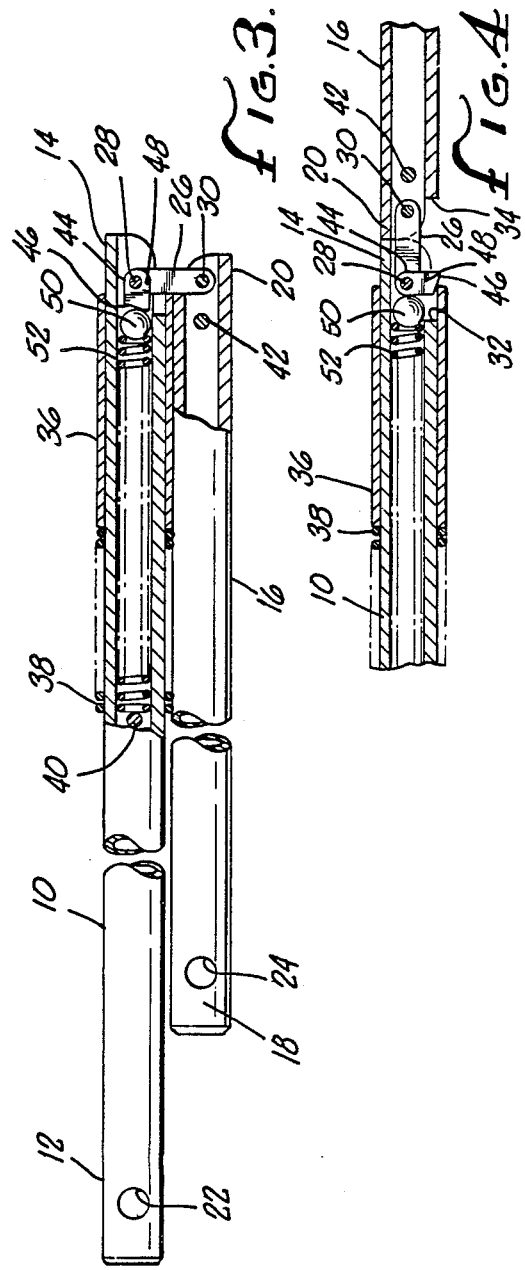

4,819,300

STRUT ASSEMBLY

BACKGROUND OF THE INVENTION

The field of the present invention is strut assemblies. More particularly, the field of the present invention is foldable or collapsible strut assemblies.

Strut assemblies have a variety of applications and are used, for example, in scaffolds, antennas, a supports for doors or panels, and in a variety of other applications involving collapsible structures. Strut assemblies having two adjoining members pivotally linked together with an overlying spring-loaded sleeve employed to provide a rigid interconnection between the members have been successfully used in the past in various applications. However, these known strut assemblies involved significant disadvantages in certain applications.

In particular, when employed to hold up a hinged panel or door such as e.g., an access panel on an aircraft, wherein two or more strut assemblies are used, it has been necessary to retract the sleeves on all of the struts attached to the panel simultaneously, so as to allow the struts to undergo a uniform folding movement together. In addition, in fairly common applications, even where only two struts are used to hold open a panel, the struts are spaced far enough apart so that the two struts are not simultaneously within the reach of a single mechanic or service technician. Therefore, in order to close the panel, a second individual must provide assistance, so that each of the sleeves can be simultaneously retracted to the release position and the struts folded. Of course, this requirement for an extra "helping hand" simply to allow the panel to be closed can be costly and time consuming.

SUMMARY OF THE INVENTION

The present invention is directed to a collapsible strut assembly having a retractable locking sleeve. The locking sleeve may be selectively retained in the retracted, or unlocked, position for collapse of the strut. In providing selective retention in the unlocked condition, an operator may more easily collapse the plurality of such struts. In this way, multiple operators and wasted time are avoided.

To accomplish the foregoing, an active member biased to interfere with the extension of the sleeve to the locked position may be used to retain the locking sleeve in the retracted position. The active member may be withdrawn from interference with the sleeve upon collapse of the strut assembly. In this way, upon subsequent erection, the locking sleeve will again automatically assume the locked position.

Accordingly, it is an object of the present invention to provide a collapsible strut assembly with an improved locking mechanism. Other and further objects and advantages will appear hereinafter.

BRIEF DESCRIPTION OF THE DRAWINGS

In the drawings wherein similar reference characters denote similar elements throughout the several views, FIG. 1 is a side view of the strut assembly of the present invention in the open or erected position;

FIG. 2 is a cross-sectional side view of the strut assembly of FIG. 1;

FIG. 3 is a side elevation view, partially in section, of the strut assembly of FIG. 1 in the collapsed or closed position; and FIG. 4 is a fragmentarily side view in cross section of the strut assembly of FIG. 1 in the open position illustrating the sleeve in the retracted position.

DETAILED DESCRIPTION OF THE PREFERRED EMBODIMENT

Turning in detail to the drawings, a strut assembly includes a first section 10 having a supported end 12 and the jointed end 14. A second section 16 also includes a supported end 18 and a jointed end 20. The supported ends 12 and 18 are typically to be associated with a frame or body and a panel. The panel is likely to be pivotally mounted to the frame or body and is held outwardly therefrom by one or more strut assemblies. In order that the assemblies may collapse, the supported ends 12 and 18 are both pivotally associated with the body or panel at pivot points 22 and 24, respectively. Thus, for example, the pivot point 22 may be the point of attachment of the strut assembly to the frame or body while the pivot point 24 may be the point of attachment to a door or panel.

The jointed ends 14 and 20 of the sections are pivotally joined by means of a link 26. The link 26 is joined to the jointed end 14 by means of a pin 28. Similarly, the link 26 is pivotally joined with the jointed end 20 by means of a pin 30. Thus, the strut assembly may collapse or extend by relative pivotal movement of the first section 10 and the second section 16 associated by means of the link 26. The jointed ends 14 and 20 are configured for association with the link 26 and the relative movement therebetween. Each end 14 and 20 includes a slot 32 and 34, respectively. This slot accommodates passage of the link 26 to a orientation perpendicular to each of the sections 10 and 16, as best seen in FIG. 3. Naturally, each of the hollow sections 10 and 16 are open at the jointed ends 14 and 20 for receipt of the link 26 when extended, such as illustrated in FIGS. 2 and 4.

Associated with the first section 10 is a sleeve 36 which is slidably disposed on the outer surface of the first section 10. The sleeve 36 is shown to be knurled for purposes of easy manual purchase. Associated with the sleeve 36 is a compression spring 38. The compression spring 38 is retained between the sleeve 36 and a pin 40. Thus, the sleeve 36 is resiliently biased to a position over the jointed ends 14 and 20. To limit the extension of the sleeve 36, a second stop pin 42 is provided on the second section 16. Thus, the compression spring 38 may remain under compression even with the sleeve 36 fully extended to the pin 42. Thus, positive retention of the sleeve 36 in the locked position is achieved. The spring 38 is also of sufficient length to allow substantial compression thereof as the sleeve 36 is retracted from the joint to a position as illustrated in FIG. 4.

Associated with the link 26 and pinned relative thereto on the pin 28 is a retaining member 44. The retaining member 44 extends to a beveled end 46 displaced from the pin 28. The beveled end 46 is sufficiently displaced from the pin 28 that it may be oriented to extend into the path of travel of the sleeve 36, as best seen in FIG. 4. In this orientation, the retaining member 44 extends outwardly through the slot 32. To prevent rotation beyond a predetermined angle relative to the link 26, the retaining member 44 includes a stop 48 which extends laterally of the retaining member 44 to adjacent the link 26. As seen in the preferred embodiment and in FIGS. 3 and 4 specifically, the stop 48 prevents movement of the retaining member 44 relative to the link 26 beyond a 90 degree orientation thereto.

The retaining member 44 is biased toward the position of engagement with the sleeve 36. A detent mechanism including ball 50 biased by a compression spring 52 extends into the path of movement of the beveled end 46 of the retaining member 44. The beveled end 46 is in angled contact with the ball 50 so that the beveled end 46 tends to slip off the ball when free to do so. The compression spring 52 also rests against the pin 40 within the hollow jointed end 14 of the first section 10.

Turning to the operation of the strut assembly, for ease of description an extended and locked condition is first assumed. Such a condition is illustrated in FIG. 1. With the sleeve 36 extending over the jointed ends 14 and 20, the strut assembly is extended and locked. The retaining member 44 is positioned within the sleeve 36, as illustrated in FIG. 2. The biased ball 50 in turn biases the retaining member 44 outwardly against the sleeve 36.

To collapse the strut, the sleeve 36 is gripped and retracted from over the joined end 20. As the sleeve 36 is fully retracted, the biased retaining member 44 is uncovered and springs outwardly under the influence of the bias ball 50. The retaining member 44 then stops as the stop 48 encounters the link 26. Having exposed the retaining member 44, the sleeve 36 may then be released to a position as illustrated in FIG. 4. In this position, the sleeve 36 cannot return to the locked position because of the extension of the retainer member 44 into its path of travel Because of the stop 48, the retaining member 44 cannot continue to swing out of the path of travel of the sleeve 36; and thus, FIG. 4 illustrates a stable condition for the sleeve 36. In this condition, the sections 10 and 16 are free to collapse when given a lateral push from the side of the assembly having the slots 32 and 34. When collapsed, the strut assembly assumes a position as illustrated in FIG. 3.

In the collapse of the strut assembly, the link 26 is pivotally rotated relative to the first section 10. Because the retaining member 44 is already extended to interference between the stop 48 and the link 26, as the link 26 rotates, the retaining member 44 is also rotated. As the retaining member 44 rotates, it further retracts the sleeve 36 to a small extent and then pushes the ball 50 away in opposition to the biasing force of the spring 52. When fully collapsed, the retaining member 44 is arranged such that the beveled end 46 extends against the ball 50. Having retracted the retaining member 44 from engagement with the sleeve 36, the sleeve is free to move forwardly until it engages the link 26, as seen in FIG. 3. This position is arranged such that the beveled end 46 of the retaining member 44 is now covered by the sleeve 36. As the first and second sections 10 and 16 are again extended, the link 26 is likewise extended and the retaining member 44 may move outwardly under the influence of the bias ball 50. However, the retaining member 44 comes into contact with the sleeve 36 and cannot interfere with its path of travel. As the jointed ends 14 and 20 become aligned, the sleeve 36 may progress to the pin 42 to again lock the strut assembly in its extended arrangement Thus, a folding strut assembly is disclosed which may be locked in the extended position by a slidable sleeve. The assembly also provides for an unattended unlocked condition for facilitating a collapse of a plurality of struts. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A strut assembly comprising
   a first section;
   a second section;
   a link pivotally joining said first and second sections;
   a sleeve slidably disposed on said first section and engageable with said second section, said sleeve being spring biased toward engagement with said second section;
   a member pivotally mounted by a pivot pin to said link and biased to extend into the path of extension of said sleeve, one of said link and said member including a stop extending to adjacent the other of said link and said member to limit relative rotation therebetween.

2. The strut assembly of claim 1 further comprising
   a detent extending into resilient engagement with said member to bias said member into the path of extension of said sleeve.

3. The strut assembly of claim 1 wherein said stop is located on said member.

4. The strut assembly of claim 1 wherein said link is pivotally joined to said first section at a first pivot point and pivotally joined to said second section at a second pivot point displaced from said first pivot point.

5. The strut assembly of claim 1 wherein said sleeve is biased toward engagement with said second section by a spring disposed around said first section.

6. The strut assembly of claim 1 wherein said first and second sections and said sleeve are tubular.

7. The strut assembly of claim 6 further comprising said pin pivotally joining said link to said first section and a second pin pivotally joining said link to said second section,
   said pins spaced apart by a dimension approximately equal to a diameter of one of said first and second sections.

8. A strut assembly comprising
   a first section and second section;
   a link pivotally joining said first and second sections,
   a sleeve slidably disposed on said first section and engageable with said second section;
   first biasing means for continuously biasing said sleeve toward engagement with said second section;
   a member pivotally mounted by a pivot pin to said link;
   second biasing means for biasing said member into the path of travel of said sleeve, one of said link and said member including a stop extending to adjacent the other of said link and said member.

9. The strut assembly of claim 8 further comprising a ball disposed in between said second biasing means and said member.

10. The strut assembly of claim 8 wherein said first biasing means comprises a spring disposed on said first member.

11. A strut assembly comprising a first section;
    a second section;
    a link pivotally joining said first and second sections, said link including a first pin pivotally joining said link to said first section and a second pin pivotally joining said link to said second section;

a sleeve slidably disposed on said first section and engageable with said second section, said sleeve including a compression spring biasing said sleeve toward engagement with said second section;

a member pivotally mounted with said link about said first pin and including a stop extending to adjacent said link to limit relative rotation therebetween, said member having a beveled end; and a detent extending into resilient contact with said member, said detent and said beveled end biasing said member into the path of extension of said sleeve.

* * * * *